United States Patent [19]

Vitale

[11] Patent Number: 4,465,092

[45] Date of Patent: Aug. 14, 1984

[54] VALVE WITH ANTI-REMOVAL FEATURE

[76] Inventor: Steven Vitale, 269 Greencroft Ave., Staten Island, N.Y. 10308

[21] Appl. No.: 197,477

[22] Filed: Oct. 16, 1980

[51] Int. Cl.³ .............................................. F16K 51/00
[52] U.S. Cl. .................................... 137/328; 137/385; 251/149.9; 251/148
[58] Field of Search ............ 251/148, 151, 152, 149.9, 251/89.5, 292; 137/328, 383, 385, 315, 614.06

[56] References Cited

U.S. PATENT DOCUMENTS

| | | |
|---|---|---|
| 359,714 | 3/1887 | Deming . |
| 1,231,164 | 6/1917 | Jahns et al. ........................ 137/384 |
| 1,325,189 | 12/1919 | Carter .................................. 137/385 |
| 1,870,427 | 8/1932 | Stallings et al. ...................... 70/231 |
| 2,016,797 | 8/1935 | Burns et al. . |
| 2,058,951 | 10/1936 | Buirk ...................................... 225/3 |
| 2,693,815 | 11/1954 | Gould ................................ 137/385 |
| 2,926,701 | 3/1960 | Campbell . |
| 3,002,368 | 10/1961 | Moberg . |
| 3,096,965 | 7/1963 | Margus et al. ...................... 251/315 |
| 3,391,554 | 11/1968 | Wrenshall . |
| 3,450,148 | 6/1969 | Mongelluzzo et al. ............. 137/296 |
| 3,554,218 | 1/1971 | Smith . |
| 3,560,130 | 2/1971 | Horhota . |
| 3,693,655 | 9/1972 | Frisk ........................ 251/149.9 X |
| 3,760,836 | 9/1973 | Albanese ............................ 251/292 |
| 3,920,036 | 11/1975 | Westenrieder . |
| 4,024,740 | 5/1977 | Digiovanni . |
| 4,124,036 | 11/1978 | Rogers ............................... 251/315 |
| 4,143,530 | 3/1979 | Murtezov et al. ..................... 70/165 |

FOREIGN PATENT DOCUMENTS

| | | |
|---|---|---|
| 686937 | 5/1964 | Canada ............................... 251/292 |
| 1014933 | 8/1952 | France . |
| 1190429 | 10/1959 | France . |
| 906832 | 9/1962 | United Kingdom . |

Primary Examiner—Alan Cohan
Assistant Examiner—John A. Rivell
Attorney, Agent, or Firm—Fitzpatrick, Cella, Harper & Scinto

[57] ABSTRACT

A lockable valve having features which impede unauthorized removal of the valve from a conduit to which the valve is connected. The housing of the valve has a passageway. A valve element is movably mounted to the housing for occluding the passageway. A structure operatively associated with the valve element impedes disengagement of the valve from the conduit when the valve element is in a first position. Preferably, the housing of the valve is attachable to the conduit by a fitting which is movably mounted to the housing and such fitting is accessible only through the passageway of the housing when the valve is mounted to a conduit. When the valve element occludes the passageway, it blocks access to the fitting and hence serves as part of the disengagement-impeding structure. The valve may include lugs for connecting the fitting to the housing for movement therewith when valve element is in a second position. If such lugs are provided, the valve can be disengaged from the conduit by moving the valve element to the second position and then moving the housing.

46 Claims, 13 Drawing Figures

VALVE WITH ANTI-REMOVAL FEATURE

BACKGROUND OF THE INVENTION

This invention relates to a lockable valve having features which impede unauthorized removal of the valve from a conduit to which the valve is mounted.

Lockable valves have been known for more than ninety years prior to the present invention. Such valves include a housing defining a passageway, a valve element movably mounted to the housing and means for moving the valve element to selectively occlude the passageway. Locking means for arresting movement of the valve element are also known. Ordinarily, such arresting means have been operable to prevent movement of the valve element when such element is in a closed position, i.e., a position in which the valve element completely occludes the passageway. Such a valve is movably connected to a conduit, so that the passageway through the valve communicates with the interior of the conduit. When the valve element is in the open position fluid flows to or from the conduit through the valve passageway. When the valve element is moved to the closed position, it completely blocks flow through the passageway and hence to or from the conduit. Such lockable valves have been utilized to prevent unauthorized access to the fluid contained in a conduit. For example, lockable valves have been widely utilized in the gas utility industry on pipes leading from gas mains into buildings to prevent unauthorized use of gas.

A lockable valve having a rotatable valve element and arrest means including a lock concealed in the valve housing is described in U.S. Pat. No. 359,714, issued Mar. 22, 1887 to W. H. Deming, and another lockable valve having an internal lock is described in U.S. Pat. No. 2,016,797, issued Oct. 8, 1935 to F. S. Burns et al. A lockable valve having arrest means adapted simultaneously to connect the valve element and the housing to a removable lock which does not form part of the valve is illustrated in FIGS. 1 and 2 of U.S. Pat. No. 3,002,368, issued Oct. 3, 1961 to S. M. Moberg. Another valve which utilizes a removable lock is disclosed in U.S. Pat. No. 3,560,130, issued Feb. 2, 1971 to G. Horhota. As described in U.S. Pat. No. 4,024,740 issued May 24, 1977 to B. D. DiGiovanni, the arrest means of a lockable valve may consist of a hood adapted to conceal the stem or handle normally utilized to move the valve element. Each of these references describes a device for defeating attempts by unauthorized persons to move the valve element in the housing. None of them, however, addresses the problem of attempts to defeat the lock mechanism by unauthorized removal of the valve from the conduit. Even if the valve is perfectly secure against movement of the element in the housing by unauthorized persons, the lockable valve can readily be defeated by an unauthorized person if such person can readily remove the valve from the conduit.

SUMMARY OF THE INVENTION

The present invention arises from recognition of the need to prevent unauthorized removal of lockable valves from the conduits to which they are connected. The present invention provides a lockable valve which cannot readily be removed from a conduit to which it is connected while the valve is locked. Moreover, the present invention provides this anti-removal protection without any requirement for a separate device to lock the valve to the conduit.

A lockable valve in accordance with the present invention includes a housing defining a passageway and means for releasably attaching the housing to a conduit. A valve element is mounted to the housing for movement over a range of positions and means are provided for moving the valve element through such range. The valve element can be thus moved so as to occlude the passageway. Block means, operatively associated with the valve element, are provided for impeding detachment of the housing from a conduit to which it is attached when the valve element is in a first position within the aforesaid range. Preferably, arrest means are provided for arresting movement of the lock element in the first position. Thus, while the valve element is retained in such first position by operation of the arrest means, the valve cannot readily be removed from the conduit. The block means permits detachment of the housing from the conduit when the valve element is in a second position within the range of positions.

Preferably, the means for releasably attaching the housing to a conduit includes a fitting movably mounted to the housing, the fitting being adapted for disengagement from the conduit upon motion of the fitting relative to the conduit in a predetermined direction. In such a valve, the block means may be operative to impede coupling between the fitting and a tool, such as a wrench, for movement of the fitting by the tool in such predetermined direction when the valve element is in the first position. The block means may be arranged to permit access to the fitting and thus permit direct coupling between a tool and the fitting when the valve element is in the second position.

The fitting may be threaded and adapted to engage or disengage the conduit upon rotational movement of the fitting relative to the conduit. Such a fitting may be mounted to the housing at one end of the passageway and rotatable relative thereto. When the valve element is in an open position, the fitting is accessible to a tool such as a wrench inserted into the passageway from the opposite end of the passageway. When the valve element is in a closed position, the valve element occludes the passageway at least to an extent sufficient to prevent such access. Thus, the valve element itself serves as part of the block means. The arrest means of such a valve may be arranged to arrest movement of the valve element when it is in such closed position.

Preferably, the housing, either alone or in cooperation with the conduit, surrounds the fitting and prevents access to the fitting other than by way of the passageway. Therefore, when the valve element is in the closed position, the fitting cannot be engaged by a tool for rotation relative to the conduit. Although the housing can readily be engaged and rotated, such rotation of the housing will not cause disengagement of the fitting from the conduit, the housing being free to spin uselessly while the fitting remains stationary and securely attached to the conduit.

As an alternative or as an adjunct to the direct coupling arrangement described above, the valve may be configured to allow coupling of a tool to the fitting by way of the housing. In such a valve, the block means incorporate connecting means for arresting movement of the fitting relative to the housing when the valve element is in the aforementioned second position. When the valve element is in such position, the fitting can be coupled to a tool for movement therewith by engaging the tool with the housing. For example, if a rotatably mounted fitting is utilized, the connecting means will arrest rotation of the fitting relative to the housing so that when the valve element is in the second position, the fitting can be rotated relative to the conduit by rotating the housing. However, when the valve element is in the first position, and the connecting means do not arrest rotation of the fitting, rotation of the housing will not cause disengagement of the fitting from the conduit.

These and other objects, features and advantages of the present invention will be more readily apparent from the detailed description of the preferred embodiments set forth below when read in conjunction with the accompanying drawings.

DETAILED DESCRIPTION OF THE PREFERRED EMBODIMENTS

Figures 1, 7:
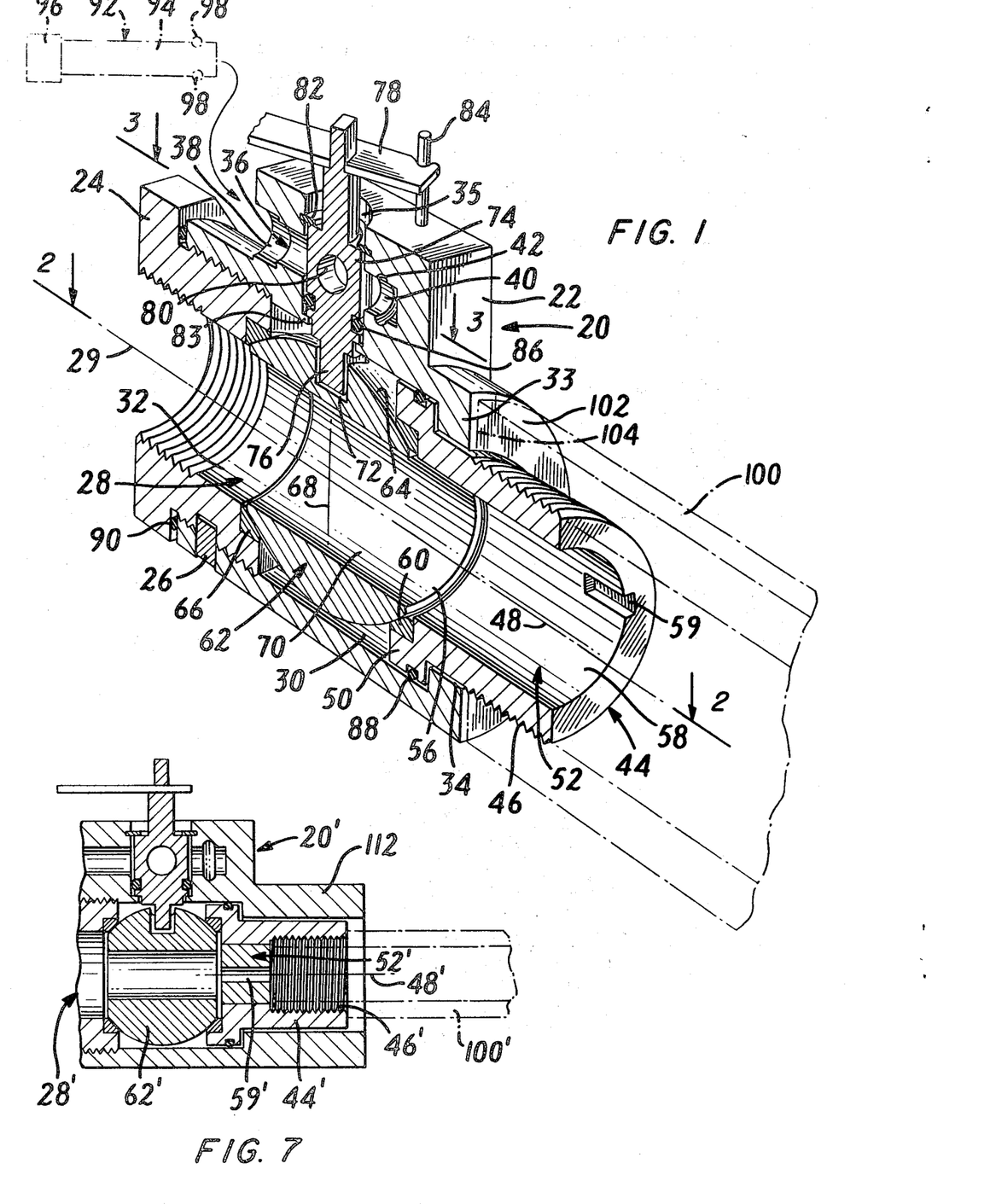
FIG. 1 is a schematic, sectional, perspective view of a valve according to a first embodiment of the present invention, such valve being depicted in conjunction with a lock suitable for use therewith and a conduit to which the valve is attached.
FIG. 7 is a fragmentary schematic sectional view depicting a valve according to a second embodiment of the present invention.

As illustrated in FIG. 1, a valve according to a first embodiment of the present invention includes a composite housing 20 formed from a main body 22 and a cap 24 threadedly engaged with body 22 and then fixed in place by a drive pin 26. Housing 20 has a straight, elongated passageway 28 having an axis 29 and open at both ends, a first part 30 of such passageway being defined by body 22 and a second part 32 of the passageway being defined by cap 24. An annular shoulder 33, formed integrally with body 22, projects into the passageway at its first open end 34. Housing 20 also has a generally cylindrical stem bore 35 perpendicularly intersecting passageway 28, the end of stem bore 35 remote from passageway 28 being open to the outside of housing 20. A generally cylindrical lock bore 36 in housing 20 intersects stem bore 35 between the intersection of stem bore 34 with passageway 28 and the open end of the stem bore. Lock bore 36 is also open to the outside of housing 20 at one end, and has a section 38 of enlarged diameter adjacent such open end. The opposite end 40 of lock bore 36 is blind. An annular groove 42 is formed in the circumferential wall of stem bore 36 adjacent blind end 40.

A fitting 44 having male pipe threads 46 around an axis 48 and an annular flange 50 coaxial with axis 48 is mounted to housing 20 at first open end 34 of passageway 28. The fitting extends into the passageway so that flange 50 is disposed inward of shoulder 33 within the passageway, the flange confronting the shoulder to prevent movement of the fitting outwardly from the passageway. The portion of fitting 44 which defines threads 46 projects outwardly from the housing. Fitting 44 is rotatable with respect to housing 20 on an axis coincident with axis 48, axis 48 also being coincident with axis 29 of passageway 28. Fitting 44 has a cylindrical fitting bore 52, the axis of fitting bore 52 being coincident with axis 48 and hence with axis 29. Fitting bore 52 has an open end 56 at the end of the fitting disposed within the housing, and another open end 58 at the end of the fitting projecting from the housing. A pair of diametrically opposed slots 59, of which only one is visible in FIG. 1, are formed in the circumferential wall of fitting bore 52. Fitting 44 also includes an annular seat 60 surrounding fitting bore 52 at open end 56, the axis of annular seat 60 being coincident with axis 48.

A ball-like valve element 62 having a spherical exterior surface 64 is disposed within passageway 28 and supported therein for rotation about valve element rotational axis 68 by annular seat 60 of fitting 44 and a similar annular seat 66 fixed to cap 24. Valve element rotational axis 68 intersects passageway axis 29 and hence intersects fitting axis 48. Valve element rotational axis 68 is coincident with the axis of stem bore 35, and axis 68 is a diametrical axis of spherical surface 64. As best appreciated by reference to FIGS. 2 and 4, rotation of valve element 62 about axis 68 is not impeded by seats 60 and 66. Valve element 62 prevents fitting 44 from being moved axially inward, (i.e., movement to the left as seen in FIG. 2), but engagement of spherical surface 64 with seat 60 of the fitting does not impede rotation of fitting 44 about axis 48.

Valve element 62 has a valve element bore 70 extending entirely through it transversely of rotational axis 68. In the open position illustrated in FIGS. 1 and 2, valve element bore 70 is coaxial with passageway 28 and fitting bore 52. Valve element 62 also has a slot 72 (FIG. 1) formed in its exterior surface and facing toward stem bore 35.

An elongated stem 74 is coaxially rotatably disposed in stem bore 35; a rectangular prong 76 on stem 74 projects into slot 72 of valve element 62 so that stem 74 is connected to valve element 62 for rotation therewith about axis 68. Engagement of prong 76 in slot 72 prevents rotation of valve element 62 about any axis other than axis 68. The end of stem 74 remote from projection 76 protrudes outwardly through the open end of stem bore 35 beyond housing 20. A handle 78 is attached to this end of stem 74 so that stem 74 and valve element 62 may be rotated about axis 68. Stem 74 has a hole 80 extending through it transversely of the axis of the stem. In the position illustrated in FIGS. 1 and 3, hole 80 is not aligned with lock bore 36, but upon rotation of stem 74 through an arc of approximately 90 degrees about axis 68, hole 80 may be aligned with lock bore 36 as seen in FIG. 5. Stem 74 is retained in stem bore 35 by a snap washer 82 (FIG. 1) engaged in a groove in the circumferential wall of stem bore 35 and by a shoulder 83 projecting into stem bore 35 at its intersection with passageway 28.

Figures 2, 3, 4, 5, 6:
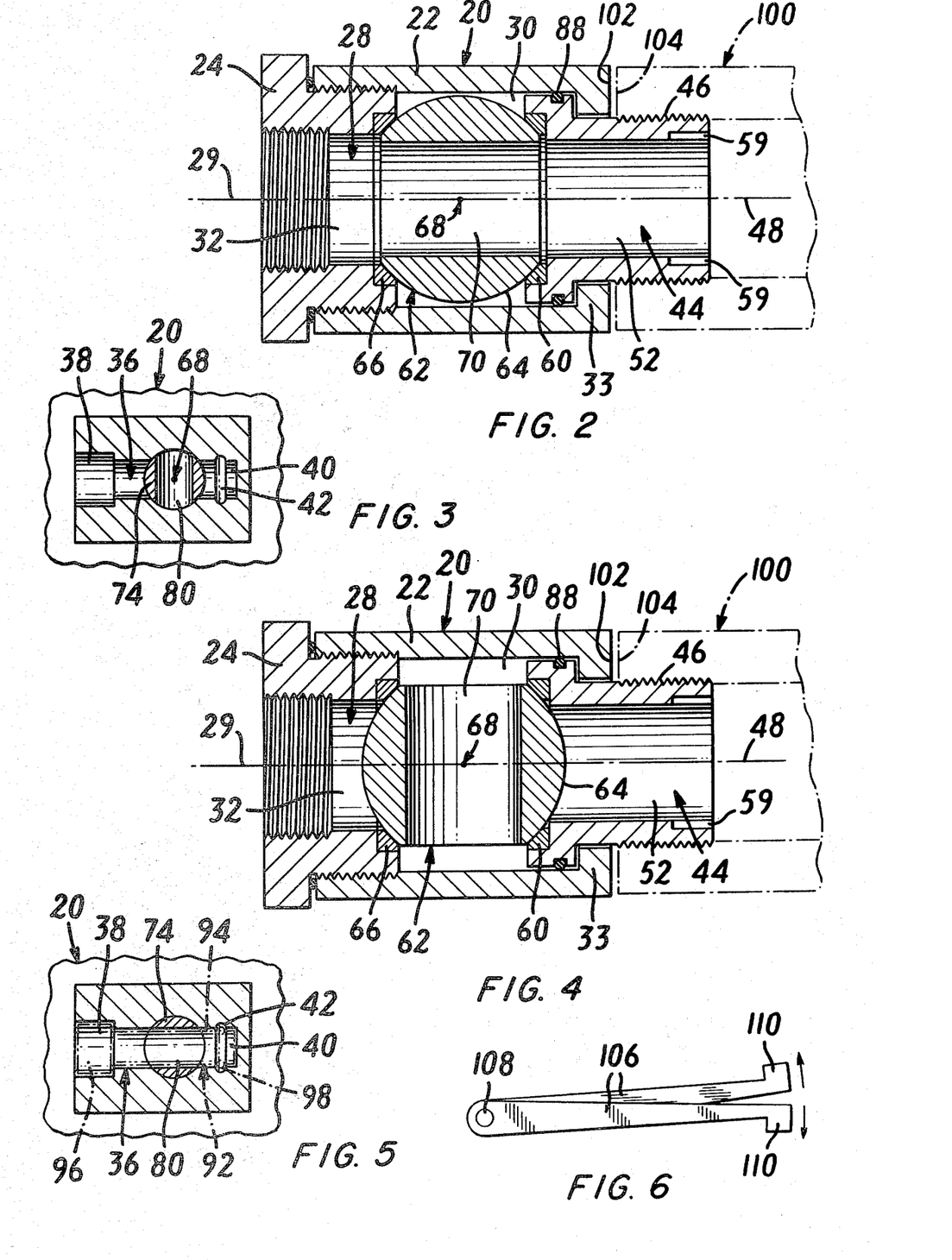
FIG. 2 is a schematic sectional view taken along line 2—2 in FIG. 1.
FIG. 3 is a fragmentary, schematic, sectional view taken along line 3—3 in FIG. 1.
FIGS. 4 and 5 are views similar to FIGS. 2 and 3 respectively, showing the valve depicted in FIGS. 1, 2 and 3 in a different operating condition from that depicted in FIGS. 1, 2 and 3.
FIG. 6 is a schematic elevational view of a wrench suitable for use with the valve shown in FIGS. 1 through 5.

A pair of stops 84, of which only one is visible in FIG. 1, are fixed to housing 20 and are engageable with handle 78 to limit the motion of handle 78 and thus limit rotation of stem 35 and valve element 62 to a range of about 90° from the position illustrated in FIGS. 1, 2 and 3.

An O-ring 86 is sealingly engaged with stem 74 and with the wall of stem bote 35, and a similar O-ring 88 is sealingly engaged with flange 50 of fitting 44 and with the wall of passageway portion 30; these seals prevent leakage of fluids from passageway 28 around the outside of stem 74 and fitting 44 respectively, but these seals do not impede rotation of stem 74 or of fitting 44 relative to housing 20. Another resilient seal 90 is sealingly engaged with cap 24 and body 22 of housing 20 to prevent leakage between the cap and the body.

The valve described above is adapted for use with an expansible pin type lock, such lock being depicted in long and short broken lines at 92 in FIG. 1. Lock 92 has an elongated body 94 and an enlarged head 96 at one end of the body. A pair of spherical elements 98 are movably mounted to body 94. A spring-loaded cam mechanism concealed within body 94 normally maintains elements 98 in the extended positions illustrated in FIG. 1; a special key (not shown) may be inserted through a small hole in head 96 to release the cam mechanism within the body 94 and allow movement of the elements 98 to retracted positions, the elements 98 being disposed within body 94 when they are in such retracted positions. One suitable pin-type lock is disclosed in U.S. Pat. No. 3,002,368, issued Oct. 3, 1961 to S. M. Moberg, and suitable pin-type locks are sold by E. J. Brooks Company of Newark, New Jersey. Keys suitable for use with such locks are available from the same source.

As illustrated in FIGS. 1, 2 and 3, the valve is in an open condition, valve element 62 being in an open position in which the axis of bore 70 is coincident with axis 29 of passageway 28, so that an open end of bore 70 is aligned with the portion 32 of passageway 28 defined by cap 24 and the opposite open end of bore 70 is aligned with fitting bore 52. Thus, when valve element 62 is in this open position, it does not substantially occlude passageway 28 or prevent the flow of fluids therethrough. When valve element 62 is in this open position, stem 74 is oriented as shown in FIGS. 1 and 3; hole 80 is not aligned with lock bore 36.

Upon rotation of the stem and valve element through an arc of about 90° from the position illustrated in FIGS. 1, 2 and 3, the valve will be in its closed condition. In this closed condition, valve element bore 70 (FIG. 4) extends transversely of passageway 28 and valve element 62 completely occludes passageway 28 at seat 66. When the valve is in this closed condition, valve element 62 is in the position illustrated in FIG. 4, stem 74 is oriented as seen in FIG. 5 and hole 80 of stem 74 is aligned with lock bore 36 of housing 20. Thus, lock 92 may be inserted into lock bore 36 so that head 96 of the lock is disposed in widened portion 38 of the lock bore and the body 94 of lock 92 extends through lock bore 36 and hole 80 of stem 74. Elements 98 of lock 92, in their extended positions, are engaged in groove 42 of lock bore 36 to prevent removal of lock 92 from the valve.

Lock 92 may only be removed from the valve by use of the key (not shown) to operate the internal mechanism of the lock so as to permit retraction of elements 98 and thus permit disengagement of a lock from the lock bore.

As will be readily appreciated, while lock 92 is disposed in lock bore 36 and hole 80, stem 74 is prevented from rotating relative to housing 20. As described above, valve element 62 is connected to stem 74 for rotation therewith. The movement of valve element 62 relative to housing 20 may thus be arrested by stem 74 and lock-bore 36 in cooperation with lock 92.

As seen in FIGS. 1, 2 and 4, the valve is mounted to a conduit 100, illustrated in broken lines. Housing 20 is juxtaposed with conduit 100 so that an end face 102 of housing 20 closely confronts an end face 104 (FIGS. 2 and 4) of conduit 100. The protruding thread defining portion of fitting 44 is received in and surrounded by conduit 100, male threads 46 of fitting 44 being threadedly and sealingly engaged with mating female threads of conduit 100. As fitting 44 is surrounded by housing 20 and conduit 100, fitting 44 cannot be directly engaged for rotation and disengagement from conduit 100 except by a tool inserted into the valve through passageway 28 to the fitting.

One type of expansible spanner or wrench suitable for this purpose is illustrated in FIG. 6 and includes a pair of arms 106 pivotally connected to one another by a rivet 108. Each arm has a prong 110 at its end remote from rivet 108. When valve element 62 is in the open position, as illustrated in FIGS. 1 and 2, the wrench illustrated in FIG. 6 may be inserted into passageway 28, through valve element bore 70 and into fitting bore 52 until prongs 110 are aligned with slots 59 of fitting 44. Arms 106 may then be swung outwardly, as indicated by the arrows in FIG. 6, to engage prongs 110 in slots 59 and thus couple the fitting to the wrench for rotation therewith. The wrench and fitting may then be rotated in disengage the fitting and hence the valve from the conduit. However, when valve element 62 is in the closed position illustrated in FIG. 4, it will be impossible to insert the wrench or any other tool through passageway 28 to engage fitting 44. Although housing 20 is exposed and can readily be engaged and rotated, such rotation of the housing will not cause disengagement of fitting 44 from the conduit because the fitting and the housing are rotatable with respect to one another. An authorized person, in possession of the proper key can remove the lock, restore the valve to the open condition illustrated in FIGS. 1, 2 and 3 and remove the valve from the conduit.

Preferably, one or more of the confronting surfaces of fitting 44 housing 20 are adhesive resistant. For example, the surface of flange 50 which confronts shoulder 33, and the surface of the shoulder which confronts the flange, may be adhesive resistant. Such adhesive resistant surfaces will impede any attempt by an unauthorized person to link the fitting to the housing for rotation therewith on fitting axis 48 by introducing an adhesive between the fitting and the housing. The term "adhesive resistant surface" as used herein means a surface to which present commercially available cyanoacrylate adhesives will not form a full strength bond under ordinary room temperature conditions. When such an adhesive is applied to an adhesive resistant surface and cured, the resulting joint will fail in shear at the juncture of the adhesive and the surface at a lower sheer loading than that required to fracture the adhesive itself internally. The preferred adhesive resistant surface is a surface coated with a lubricant, and the preferred lubricant for this purpose is graphite.

An unauthorized person may also attempt to connect the fitting to the housing for rotation therewith by drilling through the housing and the fitting and inserting a pin into the hole formed by such drilling. To resist any such attempt, the housing should preferably be formed from a hard material. Hardened steel is preferred for this purpose. The remaining components of the valve may be fabricated from conventional materials, selected according to criteria of strength, cost, ease of fabrication and compatability with environmental conditions. Merely by way of example, the stem may be formed from brass and the valve element may be formed from steel. The fitting may be formed from brass except for the seat, which preferably is formed from a low friction flurocarbon polymer.

A valve according to a second embodiment of the present invention is partially illustrated in FIG. 7. While this valve is similar to that described above with reference to FIGS. 1 through 6, the fitting 44' of the valve depicted in FIG. 7 has female pipe threads 46' adapted to engage corresponding male pipe threads of a conduit 100'. The housing 20' of this valve has a tubular skirt 112 extending coaxially with fitting 44', so that housing 20' surrounds fitting 44' over the entire extent of the fitting. As will be appreciated, housing 20' protects fitting 44' from engagement by any tool other than a tool inserted through passageway 28'. A pair of diametrically opposed slots 59' (of which only one is visible in FIG. 7) are formed in the circumferential wall of fitting bore 52' axially inward of threads 46'. These slots may be engaged by an expansible wrench such as that illustrated in FIG. 6 when valve element 62' is in the open position. However, when valve element 62' is in the closed position, it occludes passageway 28' and thus prevents such engagement of the fitting. Because fitting 44' and housing 20' are rotatable with respect to one another about axis 48' of threads 46', fitting 44' cannot be disengaged from conduit 100' by rotating housing 20'.

In the valves described above, the valve element itself blocks access to the fitting through the passageway and thus prevents disengagement of the valve from the conduit. This arrangement avoids the need for separate blocking structures. However, other structures operatively associated with the valve element may be utilized to perform this blocking function. Thus, a separate blocking gate may be employed; such a gate would be operatively associated with the valve element as by connecting it to the stem for movement therewith, and such a gate might be utilized to advantage in a valve wherein the valve element in its arrested position does not completely occlude the passageway. A separate gate might also be used to protect the valve element from assault.

Figure 8:
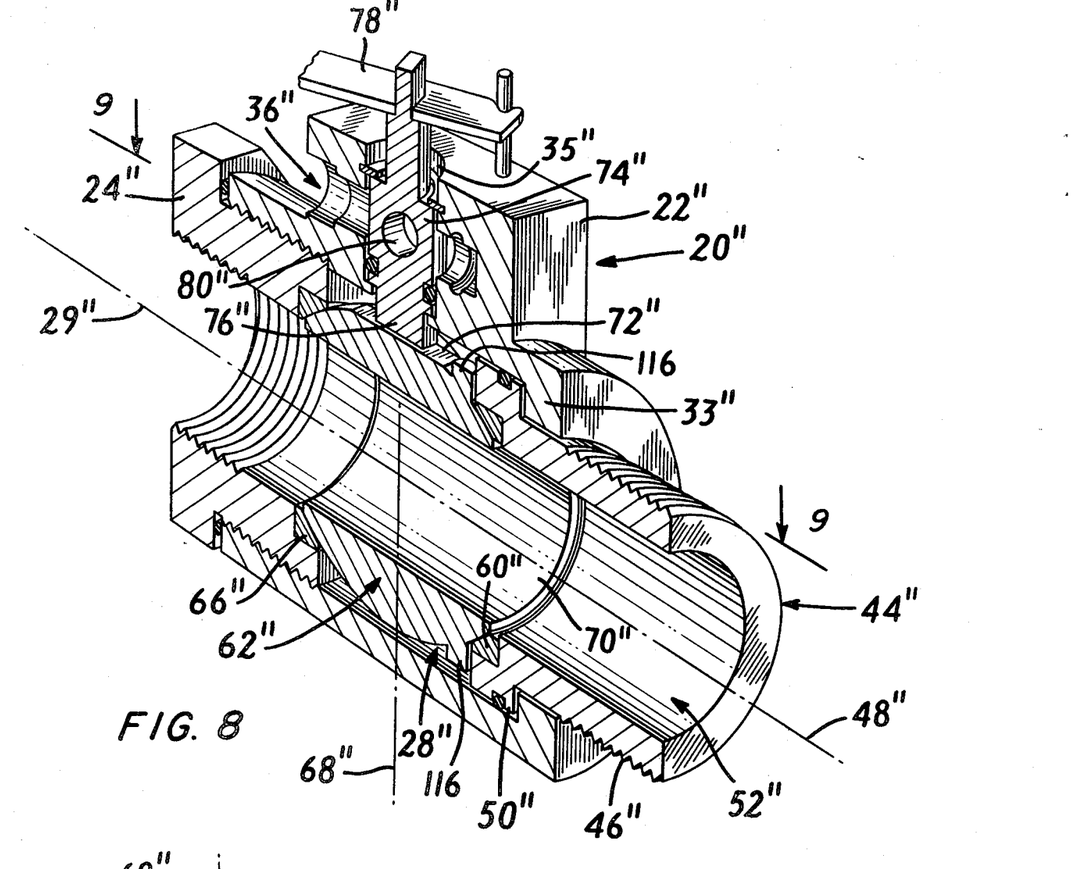
FIG. 8 is a schematic, sectional perspective view of a valve according to a third embodiment of the present invention.

A valve according to a third embodiment of the present invention incorporates means for connecting the fitting to the housing for movement therewith, and means for protecting the valve element against unauthorized removal. As illustrated in FIG. 8, the housing 20" of this valve includes a body 22" and a cap 24" which is threadedly engaged with body 22". Body 22" and cap 24" cooperatively define a passageway 28" having an axis 29". Body 22" has an annular shoulder 33" projecting into passageway 28" at one end, a stem bore 35" perpendicularly intersecting passageway 28", and a lock bore 36" intersecting stem bore 35".

Figure 12:
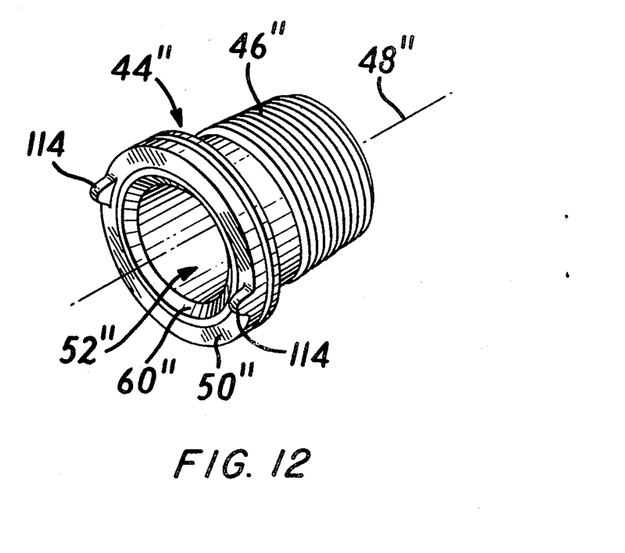
FIG. 12 is a schematic perspective view of the fitting utilized in the valve of FIGS. 8 through 10.

A fitting 44" is mounted to housing 20" at a first end of passageway 28". As illustrated in FIG. 12, fitting 44" has male pipe threads 46" around an axis 48" and an annular flange 50" coaxial with threads 46". Fitting 44" also has a fitting bore 52" which is coaxial with threads 46" and which is open at both ends. An annular seat 60" surrounds fitting bore 52" at its end adjacent flange 50". A pair of diametrically opposed projections 114 extend axially from flange 50" adjacent the periphery thereof.

Figure 11:
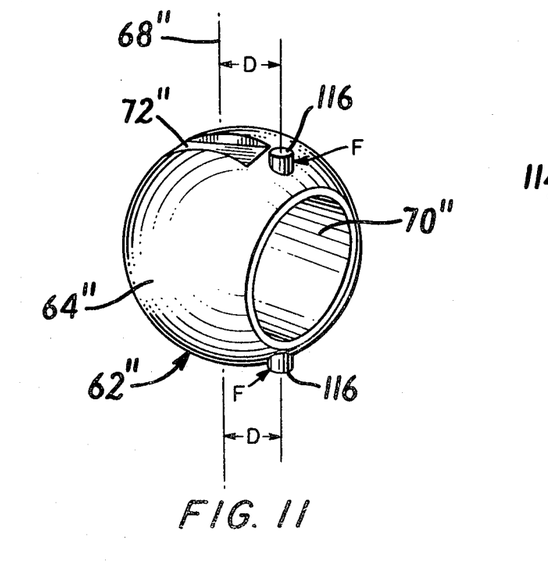
FIG. 11 is a schematic perspective view of the valve element utilized in the valve depicted in FIGS. 8 through 10.

As illustrated in FIG. 8, fitting 44" is mounted to housing 20" adjacent one end of passageway 28", flange 50" being disposed inward of shoulder 33" to retain fitting 44" on housing 20". Fitting axis 48" is coincident with axis 29" of passageway 28" and fitting 44" is rotatable relative to housing 20" about axis 48". The valve includes a valve element 62", illustrated separately in FIG. 11. Element 62" is provided with a generally spherical exterior surface 64" having a diametrical axis 68". The valve element also has a bore 70" extending through it transversely of axis 68". A slot 72", open at both ends is formed in exterior surface 64", slot 72" extending parallel to bore 70". A pair of lugs 116 are fixed to valve element 62". Both lugs 116 are disposed on the same side of axis 68", at the same distance (D) from such axis. Both lugs 116 are disposed in the same equitorial plane of spherical surface 64", such plane being the plane defined by axis 68" and the axis of bore 70".

As seen in FIG. 8, valve element 62" is supported in passageway 28" by seat 60" of fitting 44" and by a similar seat 66" on cap 24". Valve element axis 68" is transverse to axes 48" and 29" and axis 68" is coincident with the axis of stem bore 35". An elongated stem 74" is coaxially rotatably disposed in stem bore 35". Stem 74" has a hole 80" and a rectangular prong 76" which is engaged in slot 72" of valve element 62" to connect the valve element with the stem for rotation therewith about axis 68". A handle 78" is connected to the end of stem 74" remote from the valve element.

Figure 9:
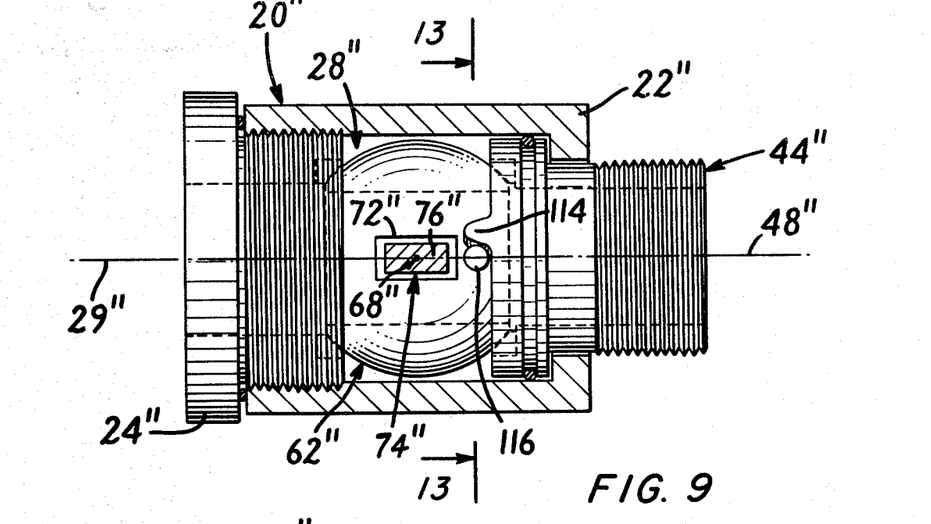
FIG. 9 is a schematic sectional view taken along line 9—9 in FIG. 8.
Figure 10:
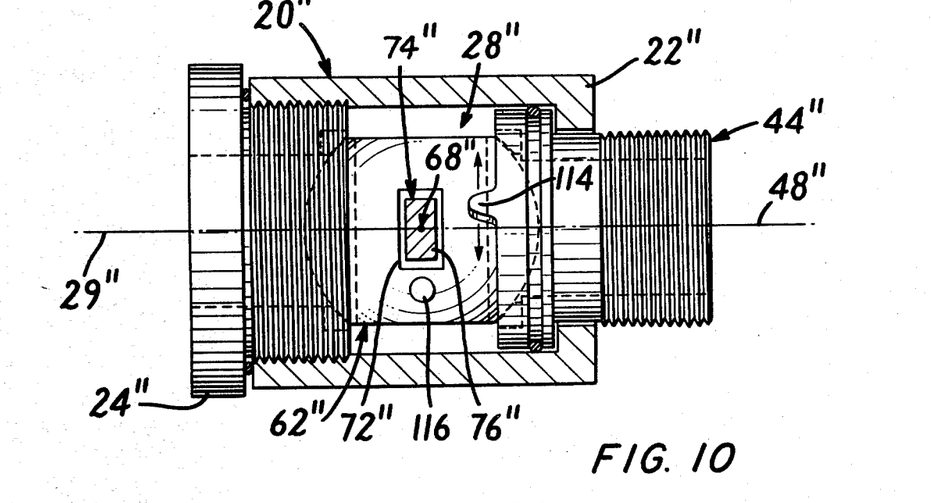
FIG. 10 is a view similar in FIG. 9, depicting the same valve in an different operating condition.

Valve element 62" and stem 74" may be rotated through an arc of about 90° between the first or closed position illustrated in FIG. 10 and the second or open position illustrated in FIGS. 8 and 9. When the valve element and stem are in such first or closed position, (FIG. 10) valve element 62" occludes passageway 28". Slot 72" also extends transversely of passageway 28". In this position, the prong 76" protects the valve element against removal from the housing. Even if cap 24" is removed by unscrewing it from body 22", valve element 62" cannot be removed from the housing. The lateral walls of slot 72" will engage prong 76" to arrest any sliding motion of valve element 62" in passageway 28". When the stem and valve element are in the position illustrated in FIG. 10, hole 80" of stem 74" (FIG. 8) is aligned with lock bore 36" so that rotation of the stem and valve element relative to the housing may be arrested by engaging a pin-type lock in the lock bore and hole. Thus, while the valve is locked in this closed position, the valve is protected against attempts by unauthorized persons to defeat the locking mechanism by removing the valve element. However, an authorized person, in possession of the proper key to actuate the lock, can disassemble the valve for repair. If the lock is removed and the stem and valve element rotated to the second or open position illustrated in FIGS. 8 and 9, then the valve element can be removed by removing cap 24" and sliding the valve element out of the housing through passageway 28". When the stem and valve element are in the second or open position, the prong 76″ will not impede removal of the valve element as the slot 72″ is disposed parallel to the axis of passageway 28″.

Figure 13:
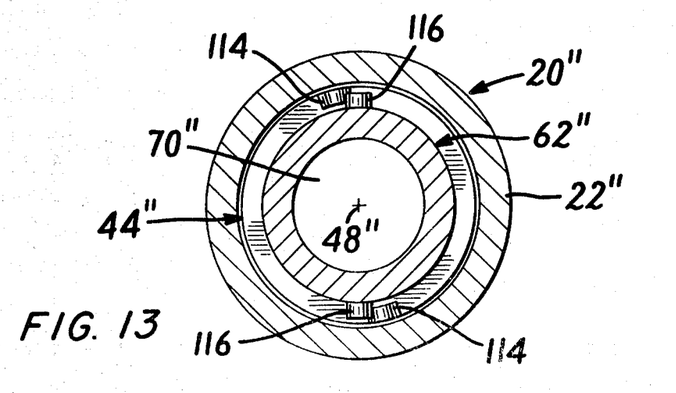
FIG. 13 is a schematic sectional view taken along line 13—13 in FIG. 9.

When valve element 62″ is in the first or closed position (FIG. 10), lugs 116 are both remote from fitting 44″. Fitting 44″ may be freely rotated with respect to housing 20″. Upon such rotation, projections 114 of the fitting will swing about fitting axis 48″ as indicated by the arrows in FIG. 10, without engaging lugs 116. However, when valve element 62″ is in the second or open position illustrated in FIGS. 8 and 9, lugs 116 are juxtaposed with flange 50″ of fitting 44″ and the lugs are disposed in the path swept by projections 114. Upon rotation of fitting 44″ relative to housing 20″, lugs 116 will be engaged with projections 114. As illustrated in FIG. 13, both projections 114 will be simultaneously engaged with lugs 116, each projection abutting one of the lugs.

Valve element 62″ and hence lugs 116 are retained against rotation relative to the housing about fitting axis 48″ by prong 76″ of stem 74″. Thus, when lugs 116 are engaged with projections 114, fitting 44″ is connected through valve element 62″ and stem 74″ to housing 20″ so that the fitting cannot rotate relative to the housing about fitting axis 48″. Therefore, when the valve element is in the second or open position, the valve can be removed from a conduit to which it is connected by rotating housing 20″ and thus rotating fitting 44″ to unscrew it from the conduit. Fitting 44′ may also be tightened onto a conduit by rotating housing 20″ in the opposite direction. During such tightening, lugs 116 will engage the sides of projections 114 opposite from those engaged during unscrewing rotation.

During threading or unthreading rotation, lugs 116 will bear on projections 114 to transmit the threading or unthreading torque. Lugs 116 will apply forces to projections 114 and projections 114 will of course apply equal but opposite reaction forces to lugs 116. The reaction forces which will be applied to lugs 116 during unthreading rotation are schematically indicated by the arrows (F) in FIG. 11. Because each of the forces (F) is applied at some distance from valve element axis 68″, each force (F) produces a torque on valve element 62″ tending to rotate it about axis 68″. However, because the forces are oppositely directed, but are applied to lugs 116 on the same side of axis 68″, the torques produced by the two reaction forces (F) will cancel one another so that essentially no net torque about axis 68″ is applied to valve element 62″. Therefore, the stem and valve element need not be restrained against rotation about axis 68″ while the valve is being installed or removed.

For the two torques to precisely cancel one another in this manner, they must be of equal magnitude. To achieve such equality, the two lugs 116 should preferably be arranged so that they bear on projections 114 at equal distances from axis 68″, and the two lugs 114 should be identical with one another and disposed at equal distances from fitting axis 48″. Even if precise equality of the two reaction torques cannot be achieved, the opposition between the two torques will ordinarily reduce the net reaction torque on the valve element to such an extent that the friction between the valve element and the seats, and between the stem and the housing, will be sufficient to retain the valve element against rotation during installation or removal.

Except as to the features specifically adverted to above, the valve described with reference to FIGS. 8 through 13 is substantially similar to the valve described with reference to FIGS. 1 through 5.

It is ordinarily unnecessary to insert any tool into passageway 29″ during removal or installation of the valve described with reference to FIGS. 8 through 13. However, fitting 44″ could be provided with slots, similar to the slots 59 of the valve depicted in FIG. 1, to allow use of an internal wrench during removal or installation. Such a feature may be useful if the fitting is especially tightly engaged or "frozen" to the conduit so that the necessary removal torque would be so great as to break projections 114 or lugs 116. Also, the valve described above with reference to FIGS. 8 through 13 could be modified for use with conduits having male threads; the fitting 44″ would be provided with female threads, and housing 20″ would be provided with a skirt surrounding fitting 44″. In these respects, such a valve would be similar to the valve described above with reference to FIG. 7.

Moreover, the valve described with reference to FIGS. 8 through 13 could be modified by providing more than two projections 114 on fitting 44′. Such additional projections should preferably be provided in diametrically opposed pairs, so that both of the lugs 116 will be simultaneously engaged during threading or unthreading rotation of the fitting. On the other hand, one of the lugs 116 and one of the projections 114 may be omitted, but such omission would eliminate the beneficial torque cancellation effect achieved by the use of paired lugs and projections. The lugs need not be directly attached to the valve element. They can be slidably mounted within the housing if an appropriate mechanism for moving the lugs in response to movement of the valve element is provided. The lugs can also be arranged for manual movement towards or away from the fitting. In such case, appropriate safeguards should be provided to prevent engagement of the lugs with the fitting while the valve element is in its first or closed position.

Because the valve described with reference to FIGS. 8 through 13 does not require insertion of a tool through the passageway during removal or installation, the principles utilized in such valve may be applied to valves having tortuous passageways into which it is impossible to insert a tool. Also, the connecting means (the lugs, valve element, stem and projections) could be arranged to connect the fitting to the housing for rotation therewith when the valve is in a closed position rather than when the valve is in an open position.

The stem and slot configuration utilized in the valve of FIGS. 8 through 13 protects the valve element against removal while the valve is locked, but permits such removal when the valve is unlocked. This arrangement can also be applied to the valve of FIGS. 1 through 5. Indeed, this arrangement can be utilized in other valves regardless of whether such other valves are protected against removal from the conduit.

The principles of the present invention can be applied to valves having valve elements other than the spherical ball-type element disclosed above. A conical plug may be substituted for the ball-type element. Also, a slidably mounted gate type valve element may be utilized. Similarly, a butterfly-type valve element would also work.

Although the valves described above are adapted for engagement with conduits having pipe threads surrounding the interior bore of the conduit, valves according to the present invention may be adapted to engage other types of conduits. Valves adapted for use with other types of conduits may have fittings other than the threaded fittings utilized in the valves described above, and such fittings may be mounted to the housing remote from the passageway.

Arrest means other than the stem and lock bore arrangement described above may be utilized in a valve according to the present invention. For example, a valve according to the present invention may have a built-in lock, and thus not require the use of a separate lock for operation of its arrest means. Also, a valve according to the present invention may incorporate a hood adapted to conceal the handle or stem normally utilized to move the valve element and thus arrest movement of the valve element.

It should also be understood that, although the preferred embodiment contemplates incorporating lock means in the structure, the same is not essential. For example if the fluid in the conduit is highly caustic, poisonous, under high pressure or otherwise dangerous, lock means may not be required. The escape of the fluid may itself prevent disengagement of the fitting unless the fluid supply is cut-off upstream.

As these and other variations and combinations of the features described above can be utilized without departing from the present invention, the foregoing description of the preferred embodiments should be taken by way of illustration, rather than by way of limitation, of the present invention as defined in the claims.

What is claimed is:

1. A valve for attachment to a conduit comprising:
   (a) a housing defining a passageway;
   (b) attachment means actuatable for releasably attaching said housing to a conduit;
   (c) a valve element mounted to said housing for movement over a range of positions;
   (d) means for moving said valve element; and
   (e) block means defined by said valve element for impeding detachment of said housing from the conduit when said valve element is in a first position within said range by impeding coupling between said attachment means and a tool for movement thereof and for permitting detachment of said housing from the conduit when said valve element is in a second position within said range.

2. A valve as claimed in claim 1, further comprising arrest means for arresting movement of said valve element relative to said housing when said valve element is in said first position.

3. A valve as claimed in claim 2 in which said attachment means includes a fitting movably mounted to said housing, said fitting being adapted to engage the conduit, said fitting being disengageable from the conduit upon motion of the fitting relative to the conduit.

4. A valve as claimed in claim 3 in which said first position is a closed position, in which said valve element at least partially occludes said passageway, said block means impeding said coupling between said fitting and said tool when said valve element is in said closed position.

5. A valve as claimed in claim 4 in which said valve element completely occludes said passageway when said valve element is in said closed position.

6. A valve as claimed in claim 4 in which said block means includes said valve element.

7. A valve as claimed in claim 6 in which said range of positions includes an open position in which said valve element does not completely occlude said passageway, said fitting being mounted to said housing at a first end of said passageway, said fitting being accessible to a tool inserted into said passageway from a second end thereof when said valve element is in said open position, said valve element preventing such access when said valve element is in said closed position.

8. A valve as claimed in claim 7 in which said fitting has threads defining a fitting axis, said fitting being rotatably mounted to said housing on an axis coincident with said fitting axis.

9. A valve as claimed in claim 8 in which said fitting defines a fitting bore, said passageway communicating with the interior of said conduit by way of said fitting bore when said fitting is engaged with said conduit and said valve element is in said open position.

10. A valve as claimed in claim 8 in which the fitting protrudes from the housing, the housing being juxtaposed to said conduit when said fitting is engaged therewith, the juxtaposed conduit and housing cooperatively surrounding the fitting during such engagement.

11. A valve as claimed in claim 10 in which the portion of said fitting which protrudes from said housing is provided with said threads, said housing having a face transverse to said fitting axis, said face surrounding said fitting so that when said fitting is engaged with said conduit said face confronts an end of said conduit.

12. A valve as claimed in claim 11 in which the threads of said fitting are male.

13. A valve as claimed in claim 8 in which said housing surrounds said fitting over substantially the entire axial extent of said fitting.

14. A valve as claimed in claim 9 in which a portion of said fitting is received in said passageway, said housing being provided with a shoulder projecting into the passageway, said fitting having a flange disposed axially inward of said shoulder, said shoulder confronting said flange to retain said fitting.

15. A valve as claimed in claim 7 in which said valve element is rotatably mounted to said housing within said passageway on a valve element axis transverse to said passageway.

16. A valve as claimed in claim 15 in which said valve element has a valve element bore extending transversely of said valve element axis, such bore being aligned with said passageway when said valve element is in said open position so that said fitting is accessible through such bore, said valve element bore being nonaligned with said passageway when said valve element is in said closed position.

17. A valve as claimed in claim 16 in which said fitting has a fitting bore and has threads extending around a fitting axis, said fitting being mounted to the housing for rotation on said fitting axis, said passageway communicating with the interior of said conduit by way of said fitting bore and said valve element bore when said fitting is engaged with said conduit and said valve element is in said open position.

18. A valve as claimed in claim 17 in which said valve element has a spherical exterior surface, said fitting axis being transverse to said valve element axis, said fitting having a seat said seat bearing on said spherical surface at least when said valve element is in said closed position.

19. A valve as claimed in claim 18 in which said valve element axis is a diametrical axis of said spherical surface, said seat bearing on said spherical surface when said valve element is in any position within said range of positions so that said valve element serves to prevent axial displacement of said fitting into said housing.

20. A valve as claimed in claim 16 or claim 19 in which said valve element bore is coaxial with said fitting bore when said valve element is in said open position, the axis of said fitting bore being coincident with said fitting axis.

21. A valve as claimed in claim 20 in which said passageway is straight and coaxial with said fitting bore.

22. A valve as claimed in claim 17, claim 19 or claim 21 in which said fitting has a structural feature adapted for engagement by a wrench, such structural feature being accessible through said valve element bore when said valve element is in said open position.

23. A valve as claimed in claim 22 in which said structural feature is a slot in the wall of said fitting bore.

24. A valve as claimed in claim 3 in which said block means includes means for connecting said fitting to said housing for movement therewith when said valve element is in a second position within said range, so that when said valve element is in said second position, said fitting may be coupled to a tool for movement therewith by coupling such tool to said housing.

25. A valve as claimed in claim 24 in which said connecting means includes said valve element.

26. A valve as claimed in claim 24 in which said connecting means includes a lug movably mounted to said housing and lug control means for retaining said lug in an inoperative position remote from said fitting when said valve element is in said first position, said lug control means also being operative to permit movement of said lug to an operative position in which said lug is adjacent to said fitting when said valve element is in said second position, said connecting means also including means for engaging said lug with said fitting when said lug is in said operative position.

27. A valve as claimed in claim 26 in which said lug control means is operative to move said lug from said inoperative position to said operative position upon movement of said valve element from said first position to said second position.

28. A valve as claimed in claim 24 in which said fitting is rotatably mounted to said housing on a fitting axis, said connecting means being operable to arrest rotation of said fitting relative to said housing when said valve element is in said second position.

29. A valve as claimed in claim 28 in which said fitting has threads coaxial with said fitting axis.

30. A valve as claimed in claim 28 in which said fitting is mounted to said housing at one end of said passageway, said valve element being mounted to said housing within said passageway for rotation about a valve element axis transverse to said fitting axis, said connecting means including a lug connected to said valve element for movement therewith about said valve element axis, said lug being remote from said fitting when said valve element is in said first position, said lug being juxtaposed with said fitting when said valve element is in said second position so that when said valve element is in said second position, said lug will engage said fitting to arrest rotation of said fitting on said fitting axis.

31. A valve as claimed in claim 30 in which said connecting means includes a second lug connected to said valve element for movement therewith about said valve element axis so that when said valve element is in said first position, said second lug is remote from said fitting, but when said valve element is in said second position and second lug is juxtaposed with said fitting, said first and second lugs being disposed on opposite sides of said fitting axis, said lugs being arranged to simultaneously engage said fitting.

32. A valve as claimed in claim 31 in which the location at which said first lug engages said fitting and the location at which said second lug engages said fitting are substantially equidistant from said valve element axis.

33. A valve as claimed in claim 31 in which said fitting has a pair of diametrically opposed projections said projections extending from said fitting towards said valve element, said lugs being engagable with said projections.

34. A valve as claimed in claim 30 in which said valve element has a valve element bore extending transversely of said valve element axis, such bore being aligned with said passageway when said valve element is in said second position, said valve element bore being nonaligned with said passageway when said valve element is in said first position.

35. A valve as claimed in claim 34 in which said fitting has a fitting bore, said passageway communicating with the interior of said conduit by way of said fitting bore and said valve element bore when said fitting is engaged with said conduit and said valve element is in said second position.

36. A valve as claimed in claim 30 in which said valve element has a spherical exterior surface, said fitting having a seat, said seat bearing on said spherical surface at least when said valve element is in said second position.

37. A valve as claimed in claim 36 in which said valve element axis is diametrical axis of said spherical surface, said seat bearing on said spherical surface when said valve element is in any position within said range of positions so that said valve element serves to prevent axial displacement of said fitting into said housing.

38. A valve as claimed in claim 37 in which a portion of said fitting is received in said passageway, said housing being provided with a shoulder projecting into the passageway, said fitting having a flange disposed axially inward of said shoulder, said shoulder confronting said flange to retain said fitting.

39. A valve as claimed in claim 29 in which the fitting protrudes from the housing, the housing being juxtaposed to said conduit when said fitting is engaged therewith, the juxtaposed conduit and housing cooperatively surrounding the fitting during such engagement.

40. A valve as claimed in claim 39 in which the portion of said fitting which protrudes from said housing is provided with said threads, said housing having a face transverse to said fitting axis, said face surrounding said fitting so that when said fitting is engaged with said conduit said face confronts an end of said conduit.

41. A valve as claimed in claim 40 in which the threads of said fitting are male.

42. A valve as claimed in claim 28 in which said housing surrounds said fitting over substantially the entire axial extent of said fitting.

43. A valve as claimed in claim 3, claim 8 or claim 28 in which a surface of said fitting confronts a surface of said housing, one of said confronting surfaces being adhesive resistant.

44. A valve as claimed in claim 43 in which both of said confronting surfaces are adhesive resistant.

45. A valve as claimed in claim 43 in which said adhesive resistant surface includes a lubricant coating.

46. A valve as claimed in claim 45 in which said lubricant is graphite.

* * * * *

UNITED STATES PATENT AND TRADEMARK OFFICE
CERTIFICATE OF CORRECTION

PATENT NO. : 4,465,092
DATED : August 14, 1984
INVENTOR(S) : STEVEN VITALE

It is certified that error appears in the above-identified patent and that said Letters Patent is hereby corrected as shown below:

Column 5, line 13, change "bote" to --bore--.

Column 6, line 38, change "in" to --to--.

Column 11, line 44, after "thereof" insert --,--.

Signed and Sealed this

Twenty-sixth Day of February 1985

[SEAL]

*Attest:*

DONALD J. QUIGG

*Attesting Officer*  *Acting Commissioner of Patents and Trademarks*